United States Patent [19]

Tateishi

[11] Patent Number: 5,383,177
[45] Date of Patent: Jan. 17, 1995

[54] PACKET SWITCHING TESTING METHOD AND APPARATUS

[75] Inventor: Hiroomi Tateishi, Kawasaki, Japan

[73] Assignee: Fujitsu Limited, Kanagawa, Japan

[21] Appl. No.: 189,410

[22] Filed: Jan. 31, 1994

[30] Foreign Application Priority Data

Sep. 20, 1993 [JP] Japan .................. 5-233959

[51] Int. Cl.⁶ .......................... H04J 3/14; H04L 1/24; H04L 12/26
[52] U.S. Cl. ........................ 370/15; 370/17; 371/20.4; 371/20.5
[58] Field of Search ................. 370/13, 17, 60, 60.1, 370/94.1, 94.2, 94.3; 371/20.1, 20.4, 20.5, 24, 25.1, 27, 29.1

[56] References Cited

U.S. PATENT DOCUMENTS

| | | | |
|---|---|---|---|
| 4,730,313 | 3/1988 | Stephenson et al. | 371/20.5 |
| 5,027,343 | 6/1991 | Chan et al. | 371/20.1 |
| 5,142,653 | 8/1992 | Schefts | 371/20.1 |
| 5,228,042 | 7/1993 | Gauthier et al. | 371/24 |

FOREIGN PATENT DOCUMENTS 0477553 4/1992 European Pat. Off. .

Primary Examiner—Wellington Chin

[57] ABSTRACT

A packet section (21) generates each packet data by adding a packet header to each of a plurality of random patterns. A highway demultiplexing section (22) demultiplexes the generated packet data to a plurality of input highways. A packet multiplexing section (32) multiplexes the packet data to one highway, the packet data being supplied from the plurality of output highways. A depacket section (31) fetches each random pattern out of the packet data multiplexed by the packet multiplexing section. An error detector (7) detects an error in the random pattern fetched by the depacket section. A test for an under-test device is thus conducted.

18 Claims, 13 Drawing Sheets

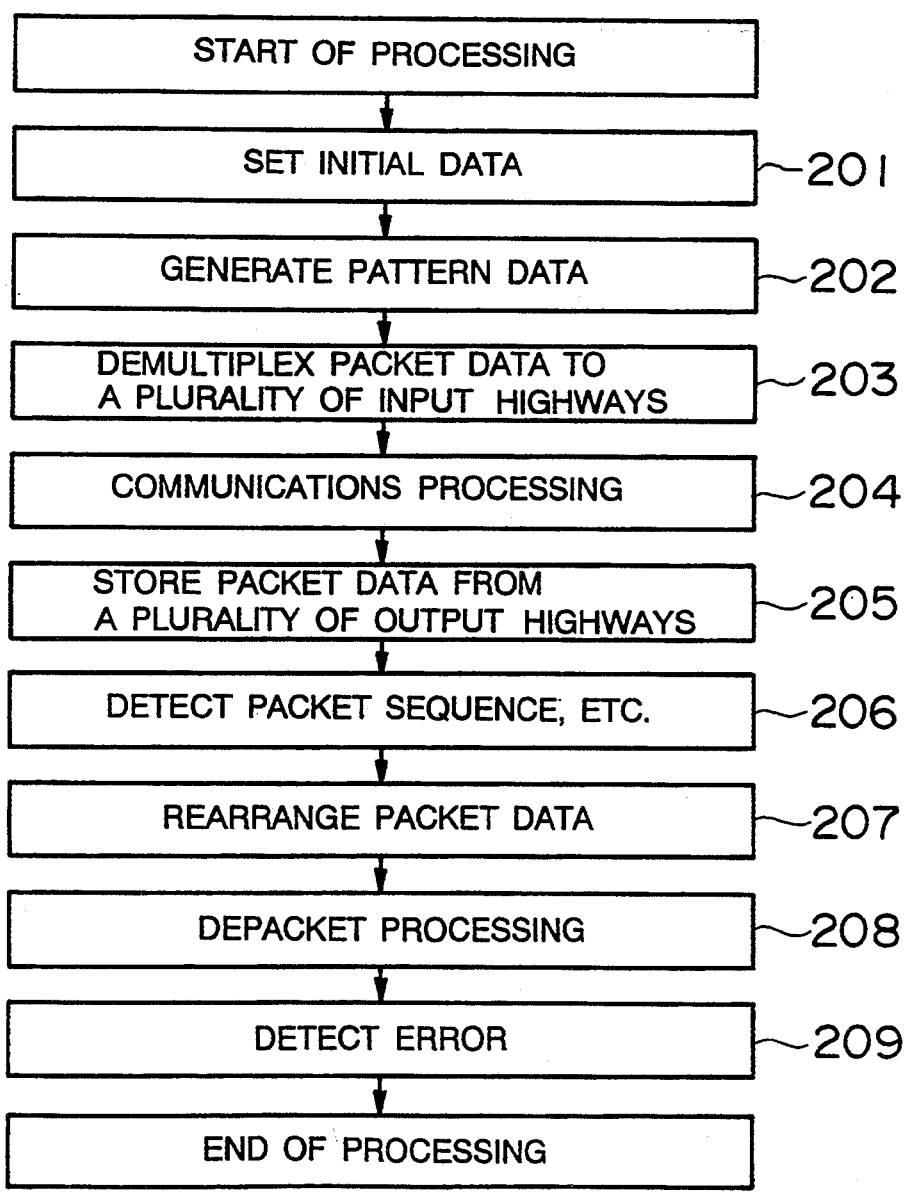

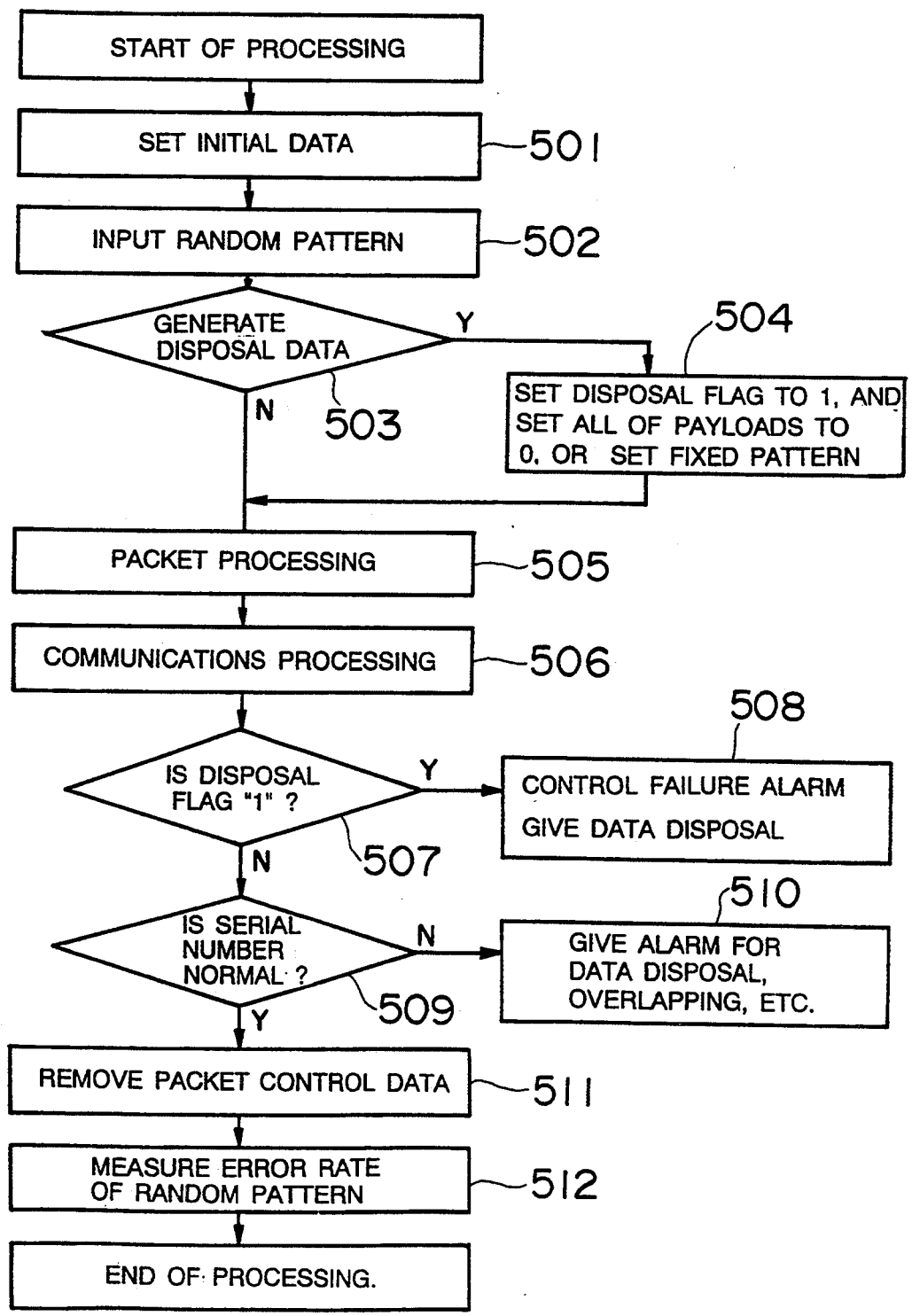

PACKET SWITCHING TESTING METHOD AND APPARATUS

BACKGROUND OF THE INVENTION

The present invention relates generally to a packet switching testing method and a packet switching testing apparatus for testing an operation of a packet switching device. The present invention relates, more particularly, to a packet switching testing method and a packet switching testing apparatus that are capable of attaining down-sizing of the apparatus and readily testing the packet switching device.

The packet switching device decomposes communications information packetwise which is given from one terminal. The packet switching device then adds, to each decomposed packet, path information containing a virtual channel identifier and a virtual path identifier. The packet switching device switches a signal path to transmit each packet to some relay circuit. The packet switching device transfers the packet from one terminal to the other terminal connected to the relay circuit.

The packet switching device described above has to transmit the packet without any error. For an assurance of a packet quality, the packet switching testing apparatus performs a test for an operation of the packet switching device.

On the transmitting side of this packet switching testing apparatus, a random pattern generator generates a plurality of random patterns representing the communications information. A packet section decomposes the plurality of generated random patterns into each random pattern. The packet section adds the path information to each random pattern, thereby generating packet data. The packet data is supplied to the packet switching device.

On the receiving side of the packet switching testing apparatus, a depacket section detects the packet data from the packet switching device in accordance with the path information. The depacket section fetches each random pattern out of the packet data. Then, an error detector detects an error in the random pattern. The packet switching device is tested based on the detection of the error in the random pattern.

When testing the plurality of packet switching devices or a plurality of packages, however, a plurality of packet switching testing apparatuses are required corresponding thereto. Further, when a plurality of I/O highways are connected to the single packet switching device or the single package, the plurality of packet switching testing apparatuses are needed corresponding to the plurality of I/O highways. This results in such a problem that the packet switching testing apparatus remarkably increases in size.

Further, the conventional packet switching testing apparatus is incapable of performing multiplex and demultiplex converting processes of the packet data on each highway and an inter-highway path switching process.

Besides, if the packet switching device effects a packet disposal and a packet loss, the packet data disappear with the packet disposal when the packet switching testing apparatus detects the random patterns. For instance, the packet section adds packet headers such as the above path information to random patterns a1, b1, c1, d1 of the serial random patterns. Packet data P1, P2, P3, P4 are thereby generated.

The packet switching device forcibly disposes of the packet data P2. A depacket section fetches the original random pattern out of each packet data. There lacks the random pattern in the packet data P2 disposed of. For this reason, the random pattern c1 is inputted to an error detector after inputting the random pattern a1. Namely, there arises a problem in which the random patterns are out of synchronism, and an error in the random pattern can not be accurately detected.

SUMMARY OF THE INVENTION

It is a primary object of the present invention to provide a packet switching testing method and a packet switching testing apparatus that are capable of attaining down-sizing of the apparatus and readily testing a packet switching device.

The packet switching testing apparatus according to the present invention performs a test for a packet switching device (hereinafter simply termed a under-test device) serving as an object for the test. The packet switching testing apparatus tests the under-test device, the arrangement being such that a plurality of input highways and a plurality of output highways are connected to the under-test device for transferring communications information packetwise.

The packet switching testing apparatus includes a transmitting section and a receiving section. The transmitting section transmits packet data to the under-test device. The receiving section receives the packet data tested by the under-test device.

The transmitting section includes a packet section and a highway demultiplexing section. The packet section generates plural pieces of packet data by adding a packet header to each of a plurality of random patterns representing the communications information.

The highway demultiplexing section demultiplexes the packet data generated by the packet section to the plurality of input highways.

The receiving sections includes a packet multiplexing section, a depacket section and an error detector. The packet multiplexing section multiplexes the packet data to one highway, the packet data being supplied via the plurality of output highways.

The depacket section fetches the random patterns out of the packet data multiplexed by the packet multiplexing section. The error detecting section detects an error in the random pattern fetched by the depacket section.

Further, the transmitting section may include an initializing section and a highway demultiplex control section. The initializing section sets a different highway number as a packet header to each of the plurality of I/O highways. The initializing section also sets a number of input highways and a number of output highways that are to be used among the plurality of input highways and the plurality of output highways.

The highway demultiplex control section demultiplexes the packet data to the highways corresponding to the numbers of I/O highways set by the initializing section.

The initializing section sets the number of input highways and the number of output highways, corresponding to the plurality of input highways and one output highway which are connected to the under-test device.

The initializing section sets the number of input highways and the number of output highways, corresponding to one input highway and the plurality of output highways which are connected to the under-test device.

The transmitting section may include a serial number means for counting a serial number per packet data. In this case, the packet section adds the serial number and the highway number to each packet data.

The receiving section includes a detecting section. The packet multiplexing section may include a storing section and a reading/writing section. The detecting section detects the serial number contained in each packet data from each output highway, a sequence of the packet data on the basis of the highway number, a delay time of the packet data and a disposal of the packet data.

The storing section stores each packet data from each output highway. The reading/writing section sequentially reads the packet data written to the storing section in the same sequence as that of the packet data generated by the packet section on the basis of the packet data sequence, the packet data delay time and the packet data disposal which have been detected by the detecting section.

The transmitting section may include a serial number stopping means and a control information adding section. The serial number stopping section supplies the serial number section with a stop signal for stopping counting the serial number with respect to the packet data to be disposed of when receiving information saying that some packet data should be disposed of.

The control information adding section controls the packet section so as not to write the random pattern but to add control information for effecting the packet disposal to the packet data to be disposed of when receiving the should-dispose-of information.

The control information may be a disposal flag for indicating the packet disposal and a fixed pattern in place of the random pattern.

Further, the receiving section includes a control information determining section and a notifying section. The control information determining section determines, when the under-test device disposes of the packet data to be disposed of and the control information, whether or not the control information is contained in the packet data from the output highways of the under-test device.

The notifying section notifies that the under-test device fails in the packet disposal when the control information determining section determines that the control information is contained in the packet data.

Moreover, according to a packet switching testing method, the under-test device is tested by connecting a plurality of input highways and a plurality of output highways to the under-test device for transferring communications information packetwise.

The packet switching testing method comprises a transmitting step and a receiving step. The transmitting step is to transmit the packet data to the under-test device. The receiving step is to receive the packet data tested by the under-test device.

The transmitting step includes a packet step and a highway demultiplexing step. The packet step is to generate plural pieces of packet data by adding a packet header to each of a plurality of random patterns representing the communications information.

The highway demultiplexing step is to demultiplex the packet data generated in the packet step to the plurality of input highways.

The receiving step includes a packet multiplexing step, depacket step and a detecting step.

The packet multiplexing step is to multiplex the packet data to one highway, the packet data being supplied via the plurality of output highways.

The depacket step is to fetch the random patterns out of the packet data multiplexed in the packet multiplexing step.

The error detecting step is to detect an error in the random pattern fetched in the depacket step.

The transmitting step includes a initializing step and a highway demultiplexing step.

The initializing step is to set a plurality of highway numbers, as packet headers, corresponding to the plurality of I/O highways. The initializing step is also to set a number of input highways and a number of output highways that are to be used among the plurality of input highways and the plurality of output highways.

The highway demultiplex control step is to demultiplex the packet data to the highways corresponding to the numbers of I/O highways set in the initializing step.

The transmitting step includes a serial number step of counting a serial number per packet data. The packet step is to add the serial number and the highway number to each packet data.

The receiving step includes a detecting step of detecting the serial number contained in each packet data from each output highway, a sequence of the packet data on the basis of the highway number, a delay time of the packet data and a disposal of the packet data.

The packet multiplexing step includes a storing step and a reading/writing step. The storing step is to cause the storing means to store each packet data from each output highway.

The reading/writing step is to sequentially read the packet data written to the storing section in the same sequence as that of the packet data generated in the packet step on the basis of the packet data sequence, the packet data delay time and the packet data disposal which have been detected in the detecting step.

The transmitting step includes a serial number stopping step and a control information adding step.

The serial number stopping step is to supply the serial number step with a stop signal for stopping counting the serial number with respect to the packet data to be disposed of when receiving information saying that some packet data should be disposed of.

The control information adding step is to control the packet step so as not to write the random pattern but to add control information for effecting the packet disposal to the packet data to be disposed of when receiving the should-dispose-of information.

The receiving step includes a control information determining step and a notifying step. The control information determining step is determine, when the under-test device disposes of the packet data to be disposed of and the control information, whether or not the control information is contained in the packet data from the output highways of the under-test device.

The notifying step is to notify that the under-test device fails in the packet disposal when determining that the control information is contained in the packet data in the control information determining step.

According to the present invention, the packet section generates the packet data by adding the packet header to each of the plurality of random patterns. The generated packet data are demultiplexed by the highway demultiplexing section to the plurality of input highways.

Then, the under-test device effects a communications process on the packet data from the plurality of input highways. Next, the packet data supplied from the plurality of output highways are multiplexed by the packet multiplexing section to one highway. The depacket section fetches the random pattern out of the packet data multiplexed. The error detecting section detects the error in the random pattern fetched.

Thus, if the under-test device to be tested requires the plural pieces of highway data, the packet data are demultiplexed to the plurality of highways or multiplexed to one highway, whereby the single packet switching testing apparatus is capable of testing the under-test device.

Further, the initializing section sets the number of input highways and the number of output highways that are to be used. The highway demultiplex control section demultiplexes the packet data to the highways corresponding to the set numbers of I/O highways.

Accordingly, even when the number of highways required for the under-test device varies, the testing apparatus remaining unchanged is capable of testing the under-test device simply by a change in setting the numbers of I/O highways.

Furthermore, according to the test involving the packet disposal, the random patterns are not written to the packet data to be disposed of, and it is therefore possible to accurately detect the error in the random pattern.

BRIEF DESCRIPTION OF THE DRAWINGS

Other objects and advantages of the present invention will become apparent during the following discussion in conjunction with the accompanying drawings, in which:

FIG. 5 is a flowchart showing the packet switching testing method in accordance with the embodiment 2 of this invention;

FIG. 12 is a flowchart showing the packet switching testing method in accordance with the embodiment 5 of this invention;

FIG. 13(b) is a diagram showing the packet data containing disposal data to be disposed of;

DETAILED DESCRIPTION OF THE PREFERRED EMBODIMENTS

Concrete embodiments of a packet switching testing apparatus of the present invention will be described.

Embodiment 1

Figure 1:
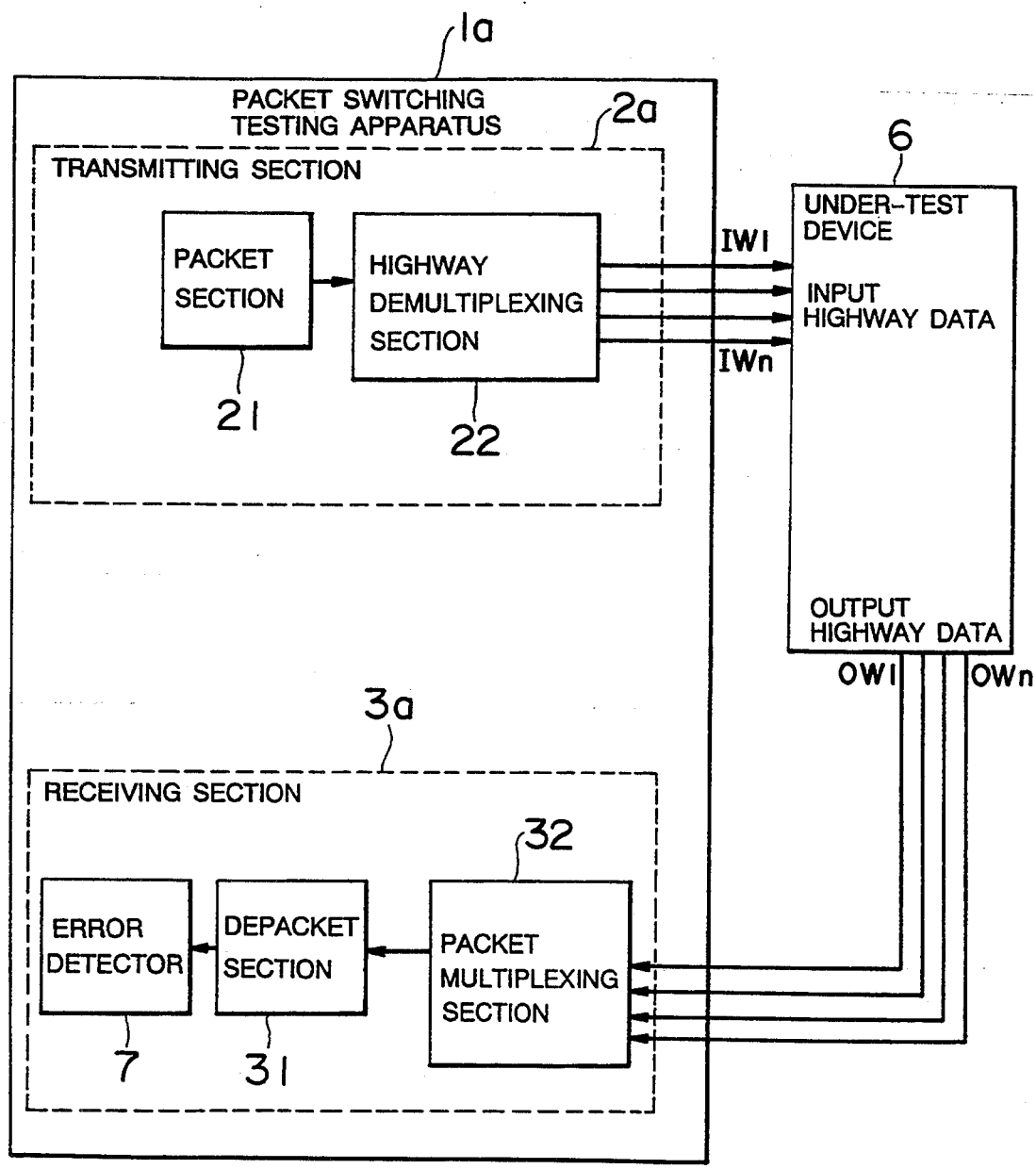
FIG. 1 is a block diagram illustrating a typical configuration of a packet switching testing apparatus in accordance with an embodiment 1 of the present invention.

FIG. 1 is a block diagram illustrating a typical configuration of a packet switching testing apparatus in accordance with an embodiment 1 of this invention.

A packet switching testing apparatus 1a is connected to an under-test device 6 via a plurality of input highways IW1~IWn and a plurality of output highways OW1~OWn. The under-test device 6 defined as a packet switching device transfers communications information packetwise.

The packet switching testing apparatus 1a tests the under-test device 6. The packet switching testing apparatus 1a includes a transmitting section 2a and a receiving section 3a.

The transmitting section 2a transmits packet data to the under-test device 6. The receiving section 3a receives the packet data tested by the under-test device 6.

The transmitting section 2a includes a packet section 21 and a highway demultiplexing section 22. The packet section 21 generates plural items of packet data by adding a packet header to each of a plurality of random patterns representing the communications information.

The highway demultiplexing section 22 demultiplexes the packet data generated by the packet section 21 to the plurality of input highways IW1~IWn.

The receiving section 3a includes a packet multiplexing section 32, a depacket section 31 and an error detecting section 7. The packet multiplexing section 32 multiplexes the packet data to one highway, the packet data being supplied via the plurality of output highways OW1~OWn.

The depacket section 31 fetches each random pattern out of the packet data multiplexed by the packet multiplexing section 32. The error detecting section 7 detects an error in each random pattern fetched by the depacket section 31.

Figure 2:
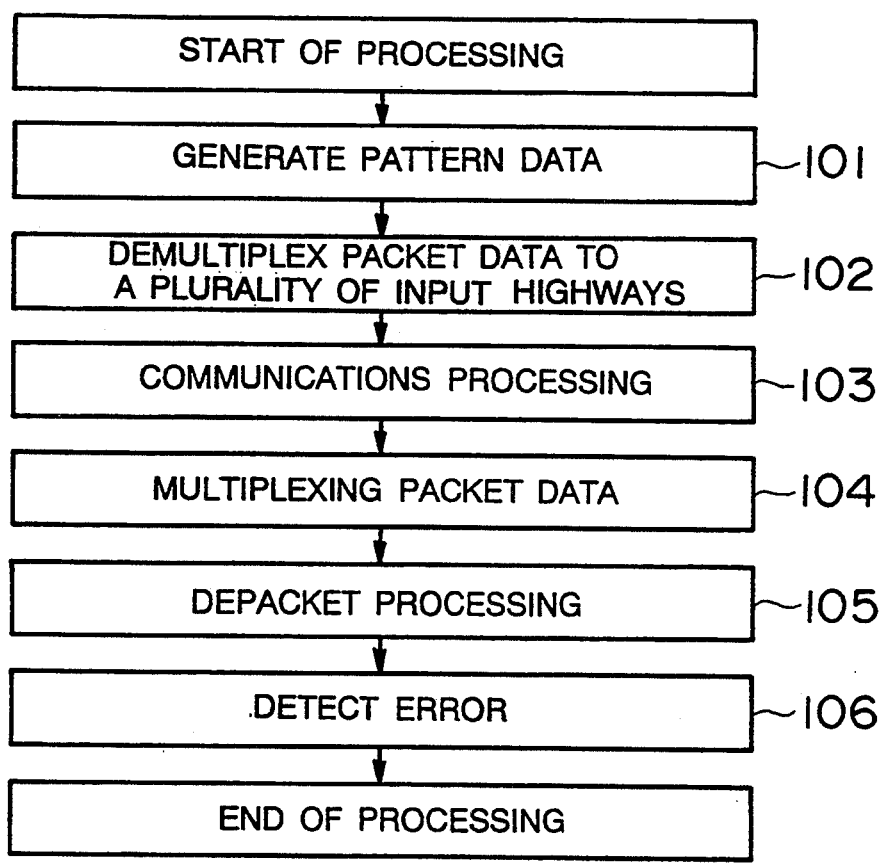
FIG. 2 is a flowchart showing a packet switching testing method in accordance with the embodiment 1 of this invention.
Figure 3A:
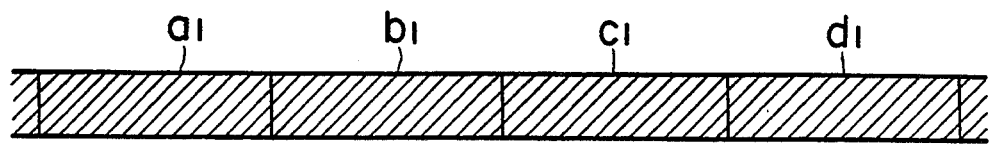
FIG. 3(a) is a diagram showing a plurality of random patterns before an under-test device is tested in the embodiment 1.
Figure 3B:
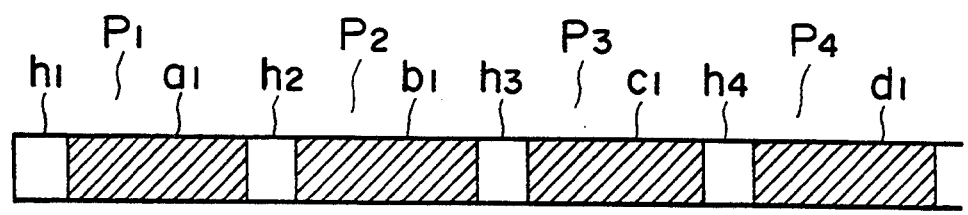
FIG. 3(b) is a diagram showing each packet data in the embodiment 1.
Figure 3C:
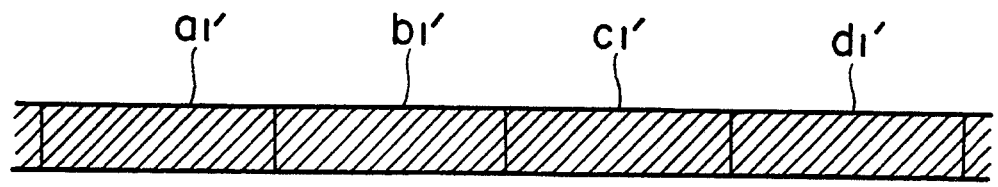
FIG. 3(c) is a diagram showing a plurality of random patterns after the under-test device has been tested in the embodiment 1.

Given is an explanation of a packet switching testing method actualized by the thus constructed packet switching testing apparatus. FIG. 2 is a flowchart showing the packet switching testing method in accordance with the embodiment 1 of the present invention. FIGS. 3(a)~3(c) are diagrams showing procedures of generating the random patterns undergoing the detection by the error detector 7 in the embodiment 1.

The embodiment 1 presents a test in which the under-test device 6 requires the plurality of input highways and the plurality of output highways.

To start with, the packet-section 21 sequentially adds each of packet headers h1, h2, h3, h4 . . . to each of a plurality of random patterns a1, b1, c1, d1 . . . illustrated in FIG. 3(a). Pieces of packet data P1, P2, P3, P4 . . . are thereby generated (step 101). Then, the respective packet data P1, P2, P3, P4 . . . are demultiplexed by the highway demultiplexing section 22 to the plurality of input highways IW1~IWn and supplied to the under-test device 6 (step 102).

Next, communications processing is conducted in the under-test device 6 (step 103). Then, the packet data P1, P2, P3, P4 . . . processed in the under-test device 6 are outputted from the plurality of output highways OW1-~OWn and inputted to the packet multiplexing section 32. The packet data P1, P2, P3, P4 . . . are multiplexed by the packet multiplexing section 32 to one highway (step 104).

The depacket section 31 eliminates the packet headers h1, h2, h3, h4 . . . contained in the packet data P1, P2, P3, P4 . . . The depacket section 31 fetches a plurality of random pattern a1', b1', c1', d1' . . . shown in FIG. 3(c) (step 105). The error detector 7 measures a rate of error in the random patterns a1', b1', c1', d1' . . . supplied from the depacket section 31 (step 106).

As described above, if the under-test device 6 to be tested requires the plural items of highway data, the packet data are demultiplexed to the plurality of highways or multiplexed to one highway. Thus, the single packet switching testing apparatus 1a is capable of testing or analyzing the under-test device 6.

Embodiment 2

Figure 4:
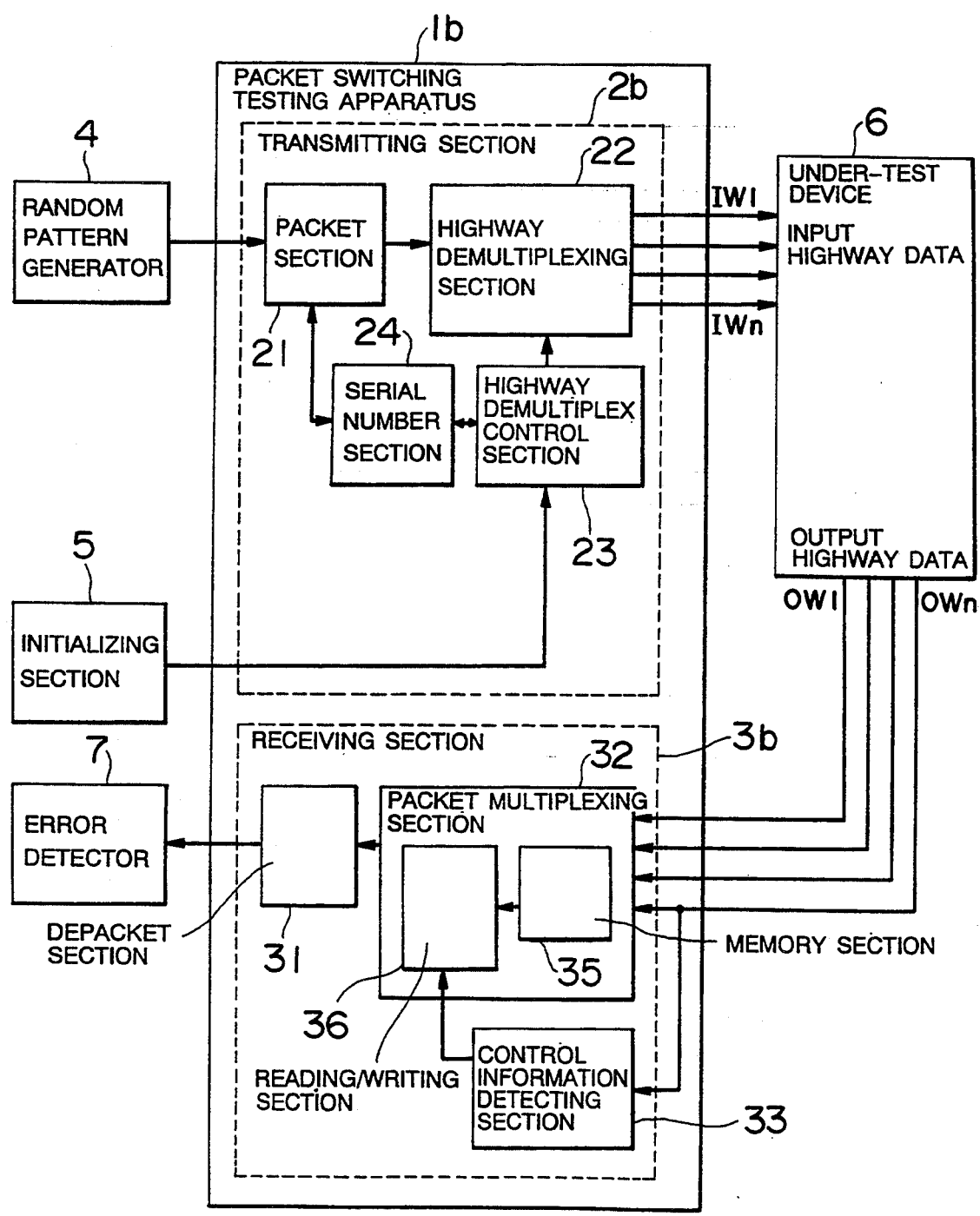
FIG. 4 is block diagram illustrating a configuration of the packet switching testing apparatus in accordance with an embodiment 2 of this invention.

FIG. 4 is a block diagram illustrating a configuration of the packet switching testing apparatus in accordance with an embodiment 2 of this invention. In the embodiment 2, the plurality of input highways IW1~IWn and the plurality of output highways OW1~OWn are connected to the under-test device 6.

Connected to a packet switching testing apparatus 1b are the under-test device 6, a random patter generator 4, an initializing section 5 and the error detector 7. The random generator 4 generates a plurality of random patterns representing the communications information and supplies the packet section 21 with these random patterns.

The initializing section 5 sets different highway numbers as packet headers to the plurality of I/O highways IW1~IWn and OW1~OWn. The initializing section 5 sets a number of input highways and a number of output highways to be used among the plurality of I/O highways IW1~IWn and OW1~OWn. The initializing section 5 supplies these numbers to a highway demultiplex control section 23. Further, the initializing section 5 sets a frequency of generating the packets.

The packet switching testing apparatus 1b includes a transmitting section 2b and a receiving section 3b. The transmitting section 2b transmits the packet data to the under-test device 6. The receiving section 3b receives the packet data from the under-test device 6.

The transmitting section 2b includes the packet section 21, the highway demultiplexing section 22, the highway demultiplex control section 23 and a serial number section 24. The packet section 21 generates the packet data by adding a packet header representing control information on a destination, etc. to each of a plurality of random patterns supplied from the random pattern generator 4, thereby generating the packet data. Herein, the control information on the destination, etc. is path information containing, e.g., the above virtual channel identifier and virtual path identifier.

The highway demultiplexing section 22 is connected to this packet section 21. The highway demultiplexing section 22 demultiplexes the packet data from the packet section 21 to the plurality of input highways IW1~IWn and supplies the packet data to the under-test device 6.

The highway demultiplex control section 23 is connected to the initializing section 5, the highway demultiplexing section 22 and the serial number section 24. The highway demultiplex control section 23 demultiplexes the packet data to the highways corresponding to the number of I/O highways set by the initializing section 5.

The serial number section 24 is connected to the highway demultiplex control section 23 and the packet section 21. The serial number section 24 counts serial numbers N1, N2 . . . each time the packet data is generated. The packet section 21 adds, to the packet data, the serial numbers N1, N2 . . . counted by the serial number section 24 and highway numbers w1, w2 . . . representing the plurality of highways.

The receiving section 3b includes a depacket section 31, a packet multiplexing section 32, a control information detecting section 33 and a control section 34.

The packet multiplexing section 32 multiplexes, to one highway, the packet data coming from the under-test device 6 but demultiplexed to the plurality of output highways OW1~OWn. The control information detecting section 33 is connected to the under-test device 6 and the packet multiplexing section 32.

The control information detecting section 33 detects a sequence of the packet data, a delay time of the pocket data and a disposal of the pocket data on the basis of the serial numbers and the highway numbers contained in the packet data from the output highways OW1~OWn.

The packet multiplexing section 32 includes a memory section 35 and a read/write section 36. The memory section 35 stores the packet data from the output highways OW1~OWn. The read/write section 36 sequentially reads the packet data written to the memory section 35 in the same sequence as that of the packet data generated by the packet section 21 on the basis of the packet data sequence, the packet data delay time and the packet data disposal that have been detected by the detecting section 33.

The depacket section 31 is connected to the packet multiplexing section 32. The depacket section 31 eliminates the packet header contained in the packet data and fetches the original random patterns.

The error detector 7 measures an error rate of the original pulse patterns supplied from the depacket section 31.

Operation of Embodiment 2

Given is an explanation of a packet switching testing method actualized by the thus constructed packet switching testing apparatus. FIG. 5 is a flowchart showing the packet switching testing method in accordance with the embodiment 2 of the present invention. FIGS. 6(a)~6(e) are diagrams showing procedures of generating the random patterns undergoing the detection by the error detector 7 in the embodiment 2. The embodiment 2 presents a test in which the under-test device 6 requires the plurality of input highways and the plurality of output highways.

To start with, the initializing section 5 sets the highway numbers w1, w2 ... representing the plurality of I/O highways IW1~IWn and OW1~OWn. Then, the initializing section 5 sets a number of input highways and a number of output highways which correspond to the plurality of I/O highways and supplies them to the highway demultiplex control section 23 (step 201).

Figure 6A:
FIG. 6(a) is a diagram illustrating the plurality of random patterns before the under-test device is tested in the embodiment 2.
Figure 6B:
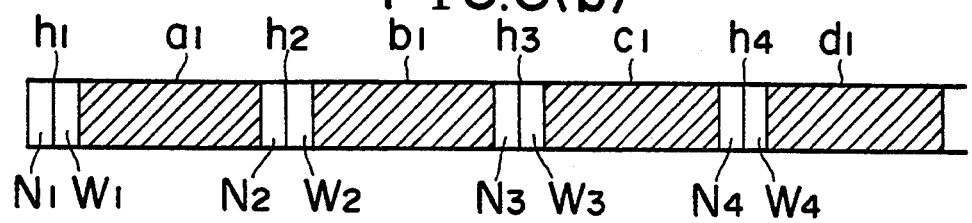
FIG. 6(b) is a diagram showing each packet data before the under-test device is tested in the embodiment 2.

Further, the random pattern generator 4 generates random patterns a1, b1, c1, d1 ... as shown in FIG. 6(a).

Next, the packet section 21 sequentially adds the serial numbers N1, N2 ... and the highway numbers w1, w2 ... to the random patterns a1, b1, c1, d1 ... The packet data are thereby generated (step 202).

Then, the packet data are demultiplexed by the highway demultiplexing section 22 to the plurality of input highways IW1~IWn and supplied to the under-test device 6 (step 203).

Next, the communications processing is conducted in the under-test device 6 (step 204). Then, the packet data processed in the under-test device 6 are outputted from the plurality of output highways OW1~OWn. The packet data are, as illustrated in FIG. 6(c), sequentially stored in the memory section 35 within the packet multiplexing section 32 (step 205).

In this case, it is because the packet data are inputted via each highway at different timings. Further, the control information detecting section 33 detects a sequence of the packet data, a delay time of the packet data and a disposal of the packet data on the basis of the serial numbers and the highway numbers contained in the packet data from the output highways (step 206).

Next, the read/write section 36 sequentially reads the packet data written to the memory section 35 in the same sequence as that of the packet data generated by the packet section 21 on the basis of the packet data sequence, the packet data delay time and the packet data disposal that have been detected by the detecting section 33 (step 207).

Figure 6C:
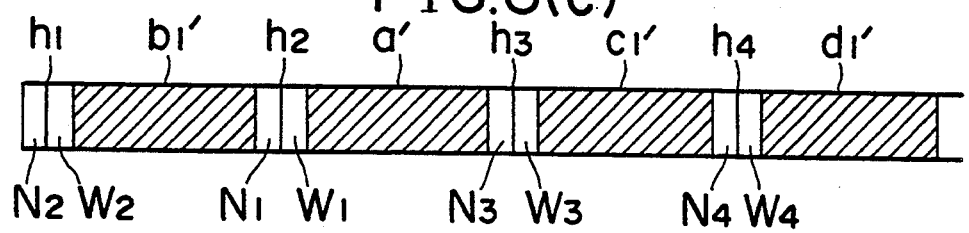
FIG. 6(c) is a diagram showing each packet data after the under-test device has been tested in the embodiment 2.

For instance, as shown in FIG. 6(c), the first packet data passing through the under-test device 6 consists of the random pattern b1', the serial number N2 and the highway number w2. The second packet data consists of the random pattern a1', the serial number N1 and the highway number w1.

Figure 6D:
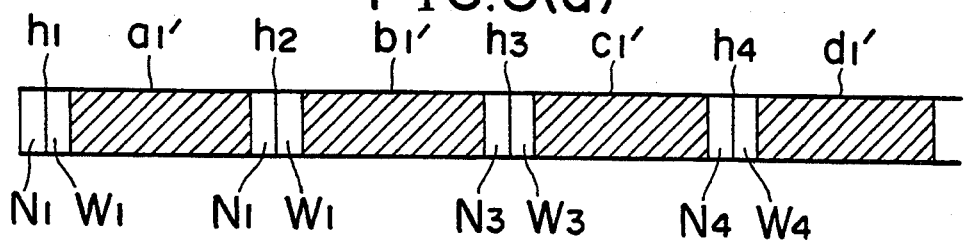
FIG. 6(d) is a diagram showing how the packet data after being tested are rearranged in the sequence of the packet data before being tested.

Hence, the first packet data shown in FIG. 6(c) is exchanged for the second packet data shown therein, thereby setting the sequence illustrated in FIG. 6(d).

Thus, the packet data are multiplexed to one highway by the packet multiplexing section 32.

Figure 6E:
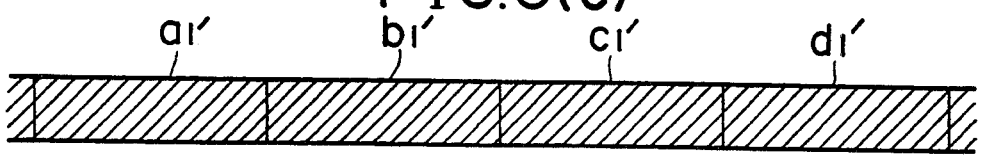
FIG. 6(e) is a diagram showing the plurality of random patterns after the under-test device has been tested in the embodiment 2.

The depacket section 31 eliminates the packet headers contained in the packet data rearranged to one highway according to the serial numbers. The depacket section 31 fetches, as illustrated in FIG. 6(e), the original random patterns a1', b1', c1', d1' ... (step 208). The error detector 7 measures an error rate of the original pulse patterns supplied from the depacket section 31 (step 209).

Accordingly, if the under-test device 6 requires the plural items of highway data, the packet data are demultiplexed to the plurality of highways or multiplexed to one highway. Thus, the single packet switching testing apparatus 1b is capable of testing or analyzing the under-test device 6.

Embodiment 3

Figure 7:
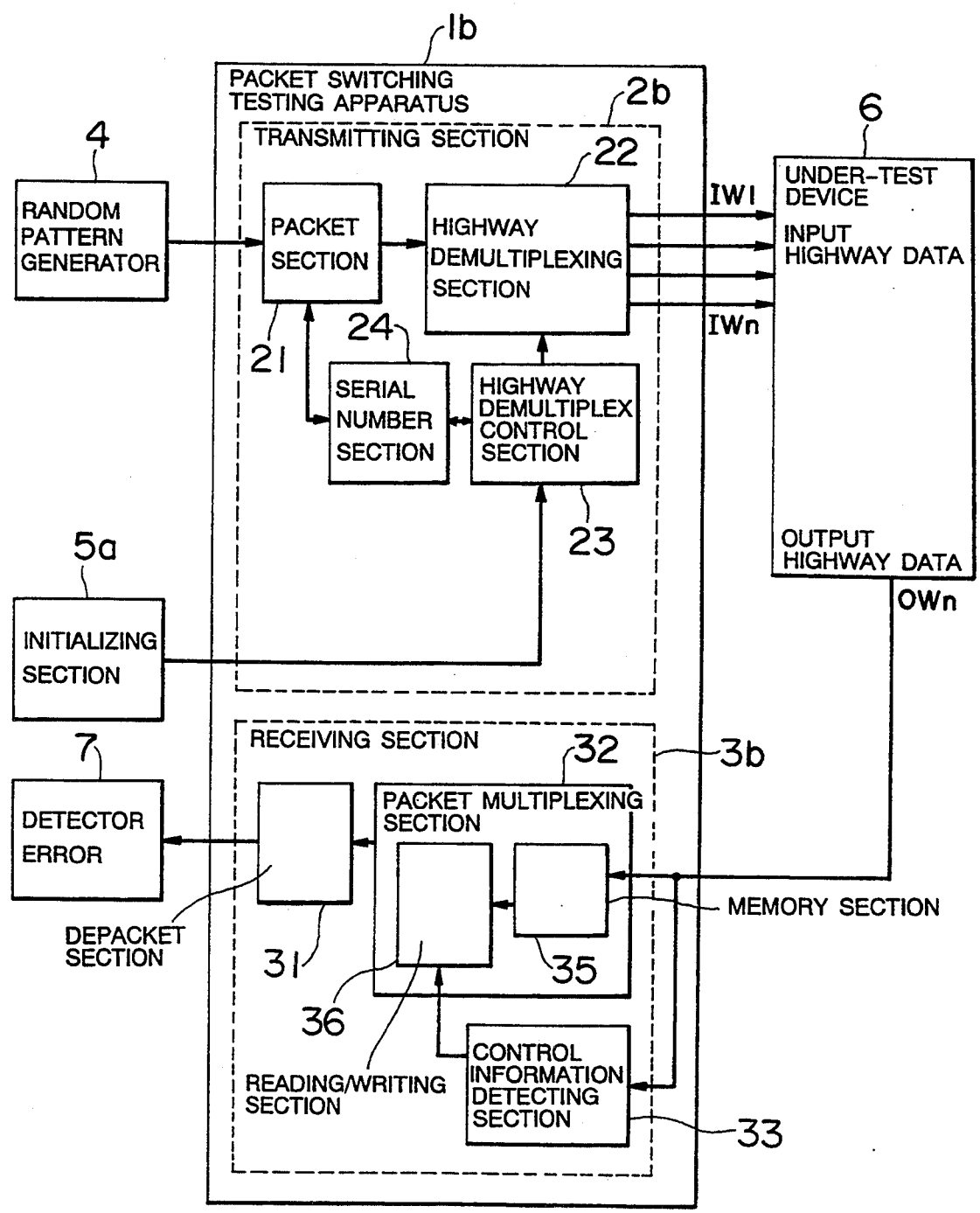
FIG. 7 is a block diagram illustrating a configuration of the packet switching testing apparatus in accordance with an embodiment 3 of this invention.

FIG. 7 is a block diagram illustrating a configuration of the packet switching testing apparatus in an embodiment 3. The embodiment 3 gives an example where the under-test device 6 incorporates an N-to-1 multiplexing function. In this case, an initializing section 5a sets a number of input highways corresponding to the plurality of input highways IW1~IWn. The initializing section 5a sets one output highway OW1 among the plurality of output highways OW1~OWn.

Figure 8:
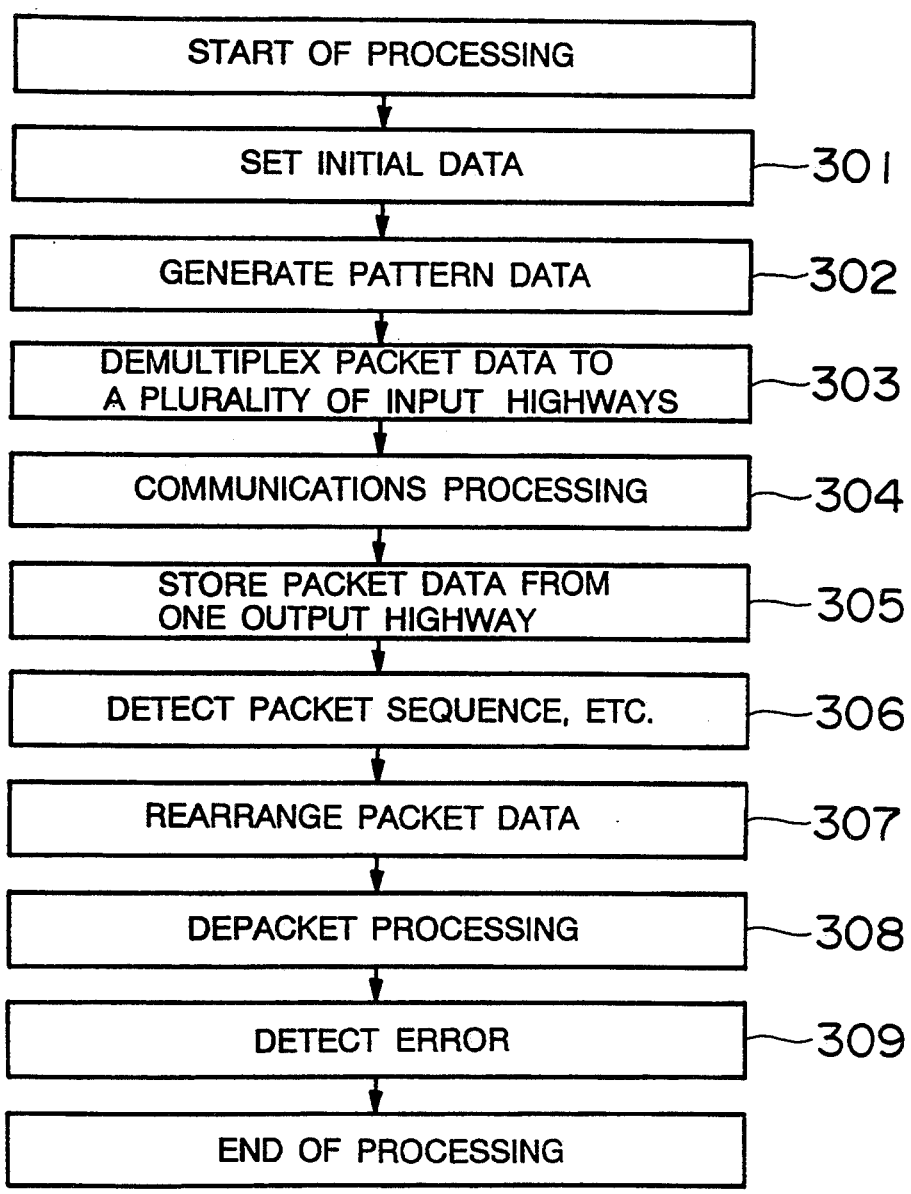
FIG. 8 is a flowchart showing the packet switching testing method in accordance with the embodiment 3 of this invention.

Other configurations are the same as those in the embodiment 2, and the same elements are marked with the like symbols. FIG. 8 is a flowchart showing the packet switching testing method in the embodiment 3.

The under-test device 6 has the N-to-1 multiplexing function, and, therefore, the initializing section 5a at first performs the initialization (step 301). More specifically, the initializing section 5a sets an input highway number n corresponding to the plurality of input highways IW1~IWn. Further, the initializing section 5a sets one output highway OW1 among the plurality of output highways OW1~OWn. The set I/O highway numbers are inputted to the highway demultiplex control section 23. The highway demultiplex control section 23 controls the highway demultiplexing section 22.

On the other hand, the packet section 21 generates the packet data (step 302). The packet data are demultiplexed to the plurality of input highways IW1~OWN by the highway demultiplexing section 22 and supplied to the under-test device 6 (step 303).

Next, the communications processing takes place in the under-test device 6 (step 304). The packet data processed in the under-test device 6 are outputted from one output highway OW1. These packet data are sequentially stored in the memory section 35 (step 305). The control information detecting section 33 detects a packet data sequence, a packet data delay time and a packet data disposal (step 306). The read/write section 36 sequentially reads the packet data written to the memory section 35 in the same sequence as that of the packet data generated by the packet section 21 on the basis of the packet data sequence, the packet data delay time and the packet data disposal that have been detected (step 307).

The depacket section 31 fetches the original random patterns by eliminating the packet headers contained in the packet data in accordance with the serial numbers (step 308). The error detector 7 measures an error rate of the original pulse patterns supplied from the depacket section 31 (step 309).

In this manner, if the under-test device 6 incorporates the multiplexing function, the packet switching testing apparatus is capable of testing the under-test device 6.

Embodiment 4

Figure 9:
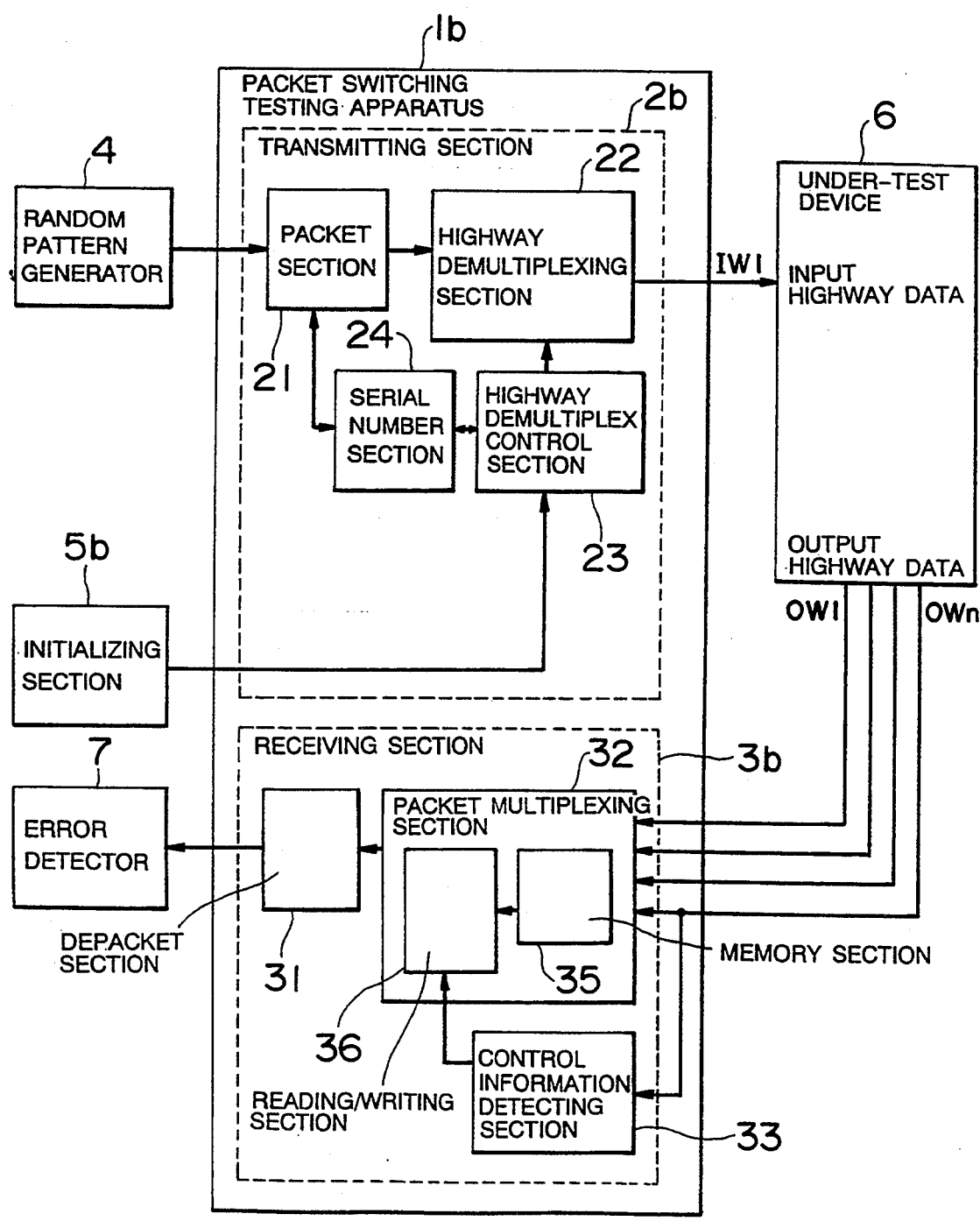
FIG. 9 is a block diagram illustrating a configuration of the packet switching testing apparatus in accordance with an embodiment 4 of this invention.

FIG. 9 is a block diagram illustrating a configuration of the packet switching testing apparatus in an embodiment 4 of this invention. The embodiment 4 gives an example where the under-test device 6 incorporates a 1-to-N demultiplexing function. In this case, an initializing section 5b sets one input highway among the plurality of input highways IW1~IWn. The initializing section 5b sets a number of the plurality of output highways corresponding to the plurality of output highways OW1~OWn.

Figure 10:
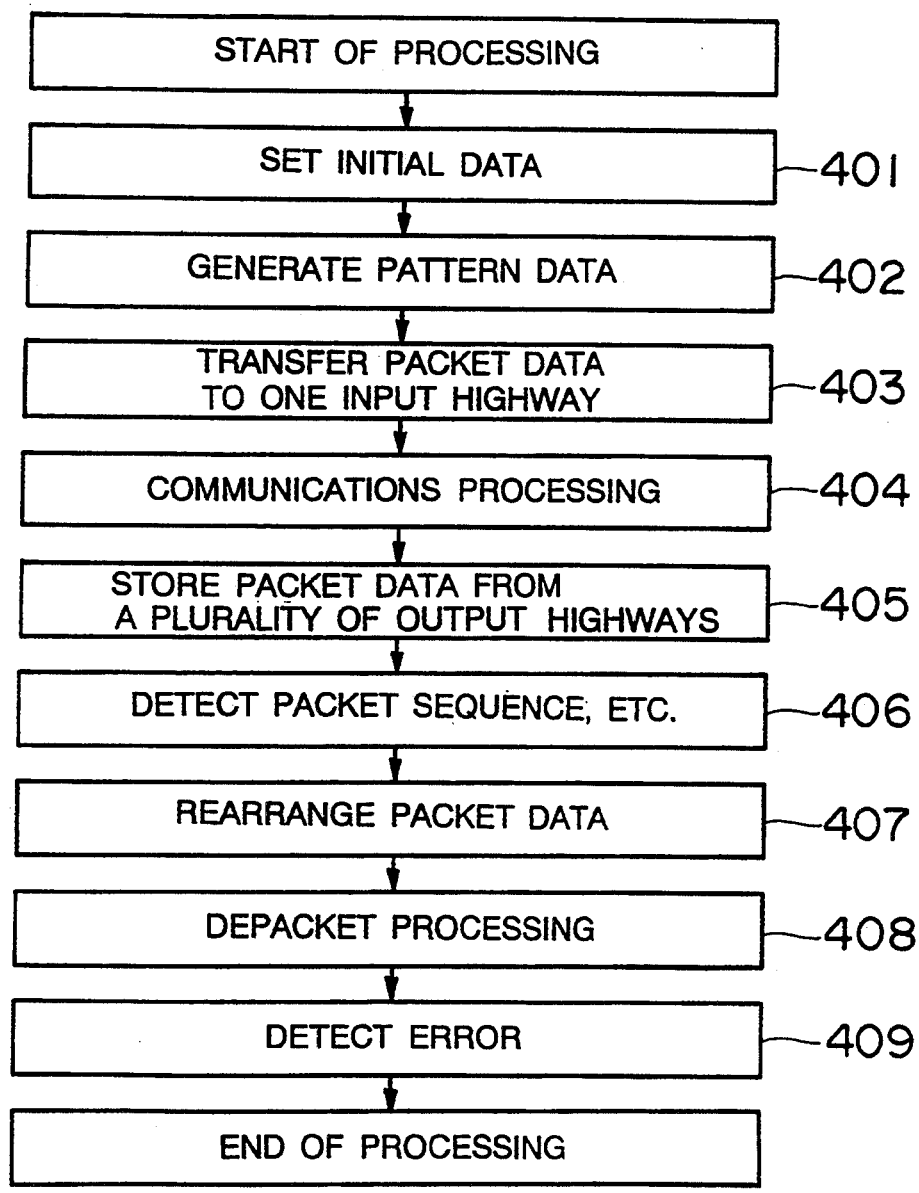
FIG. 10 is a flowchart showing the packet switching testing method in accordance with the embodiment 4 of this invention.

Other configurations are the same as those in the embodiment 2, and the same elements are marked with the like symbols. FIG. 10 is a flowchart showing the packet switching testing method in the embodiment 4 of the present invention.

The under-test device 6 has the 1-to-N demultiplexing function, and hence the initializing section 5b performs the initialization (step 401). More specifically, the initializing section 5a sets one input highway IW1 among the plurality of input highways IW1~IWn. Further, the initializing section 5b sets the plurality of output highways OW1~OWn corresponding to the plurality of output highways OW1~OWn. The set I/O highway numbers are inputted to the highway demultiplex control section 23. The highway demultiplex control section 23 controls the highway demultiplexing section 22.

The packet section 21 generates the packet data (step 402). The packet data are transferred to one input highway IW1 by the highway demultiplexing section 22 and supplied to the under-test device 6 (step 403).

Next, the communications processing is effected in the under-test device 6 (step 404). Then, the packet data processed in the under-test device 6 are outputted from the plurality of output highways OW1~OWn.

The packet data are sequentially stored in the memory section 35 (step 405). The control information detecting section 33 detects a packet data sequence, a packet data delay time and a packet data disposal (step 406). The read/write section 36 sequentially reads the packet data written to the memory section 35 in the same sequence as that of the packet data generated by the packet section 21 on the basis of the packet data sequence, the packet data delay time and the packet data disposal that have been detected (step 407).

The depacket section 31 fetches the original random patterns by eliminating the packet headers contained in the packet data in accordance with the serial numbers (step 408). The error detector 7 measures an error rate of the original pulse patterns supplied from the depacket section 31 (step 409).

In this manner, if the under-test device 6 incorporates the demultiplexing function, the packet switching testing apparatus is capable of testing the under-test device 6.

Embodiment 5

Figure 11:
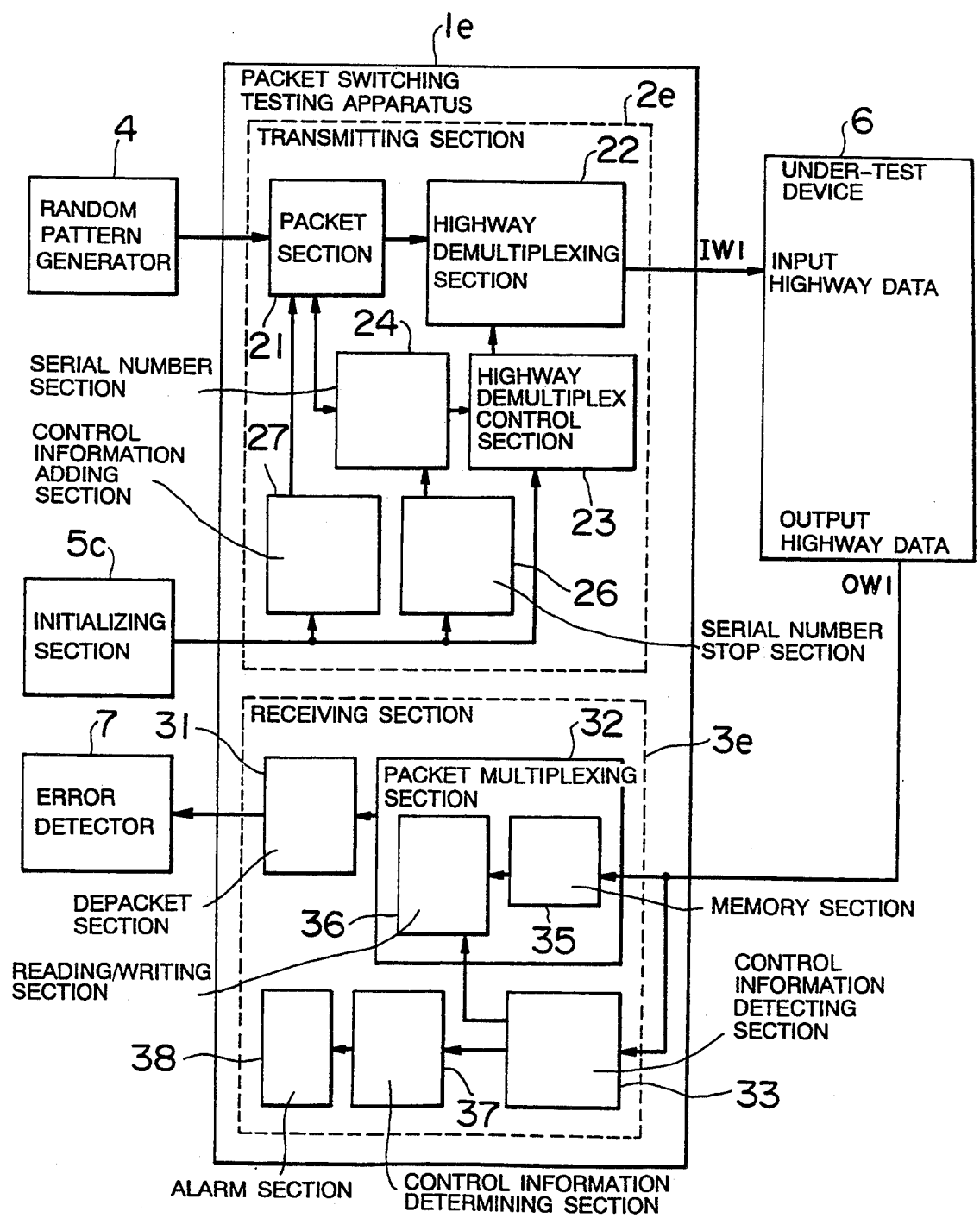
FIG. 11 is a block diagram illustrating a configuration of the packet switching testing apparatus in accordance with an embodiment 5 of this invention.

FIG. 11 is a block diagram illustrating a configuration of the packet switching testing apparatus in accordance with an embodiment 5 of this invention. The embodiment 5 gives an example where the under-test device 6 performs a packet disposal test. Herein, the highway demultiplexing section 22 is connected via one input highway IW1 to the under-test device 6. Besides, the packet multiplexing section 32 is connected via one output highway OW1 to the under-test device 6.

An initializing section 5c sets, as initial data, an input highway number, an output highway number, packet data destination information, a packet data generating frequency and a disposal flag indicating an insertion or non-insertion of the disposal data.

The above transmitting section 2 includes a serial number stop section 26 and a control information adding section 27. The serial number stop section 26 supplies the serial number section 24 with a stop signal for stopping counting the serial number with respect to the packet data to be disposed of, if the transmitting section 2 gives information saying that some packet data is disposed of.

The control information adding section 27 does not write the random pattern to the packet data to be disposed of when receiving the should-dispose-of information but controls the packet section 21 to add the control information for effecting the packet disposal.

The control information may be composed of the disposal flag indicating the packet disposal and a fixed pattern in place of the above random pattern.

Furthermore, the receiving section 3 includes a control information determining section 37 and an alarm section 38. The control information determining section 37 determines, when the under-test device 6 disposes of the packet data to be disposed of and the control information as well, whether or not the control information is contained in the packet data from the output highway OW1 of the under-test device 6.

The alarm section 38 gives information indicating a failure in the packet disposal by the under-test device 6 when the control information determining section 37 determines that the control information is contained in the packet data.

Other configurations are the same as those in the embodiment 2, and the same elements are marked with the like symbols. FIG. 12 is a flowchart showing the packet switching testing method in the embodiment 5 of this invention. FIGS. 13(a)~13(d) are diagrams showing packet disposal procedures in the embodiment 5 of this invention. The packet disposal processing will be explained with reference to those FIGURES.

To start with, the initializing section 5c sets, as initial data, an input highway number, an output highway number, packet data destination information, a packet data generating frequency and a disposal flag indicating an insertion or non-insertion of the disposal data (step 501). Herein, both the input highway number and the output highway number are set to 1.

Figure 13A:
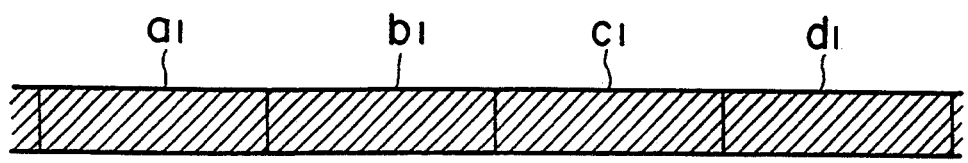
FIG. 13(a) is a diagram showing the plurality of random patterns before the under-test device disposes of the packet in the embodiment 5.

Next, the random patterns a1, b1, c1, d1 ... generated by the random pattern generator 4 but shown in FIG. 13(a) are inputted to the packet section 21 (step 502). Determined subsequently is whether or not the packet section 21 generates the disposal data with respect to any random pattern (step 503).

Herein, if the packet section 21 does not generate the disposal data with respect to any random pattern, the packet section 21 generates the packet data by adding the packet headers to the random patters (step 505).

While on the other hand, if the packet section 21 generates the disposal data with respect to some random pattern, the serial number stop section 26 stops counting the serial numbers relative to the packet data to be disposed of when receiving the should-dispose-of information with respect to some packet data from the initializing section 5.

The control information adding section 27, when receiving the should-dispose-of information, controls the packet section 21 so as not to write the random patterns but to add the control information for effecting the packet disposal to the packet data to be disposed of.

Figure 13B:
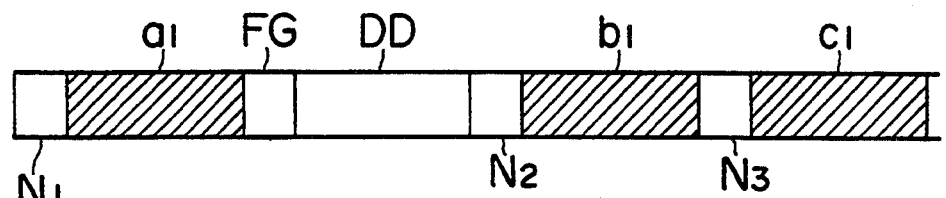

Accordingly, as illustrated in FIG. 13(b), the packet section 21 causes all of payloads to be set to "0" or alternatively sets the fixed patterns without writing the random patterns to the packet data DD for the packet disposal.

Further, a disposal flag FG "1" indicating the packet disposal is set in an empty bit of the packet header (step 504), and the action proceeds to a process of step 505.

That packet data is supplied to the under-test device 6. Herein, as shown in FIG. 13(b), after supplying the data DD to be disposed of, the packet data containing the random pattern b1 is supplied to the under-test device 6.

Figure 13C:
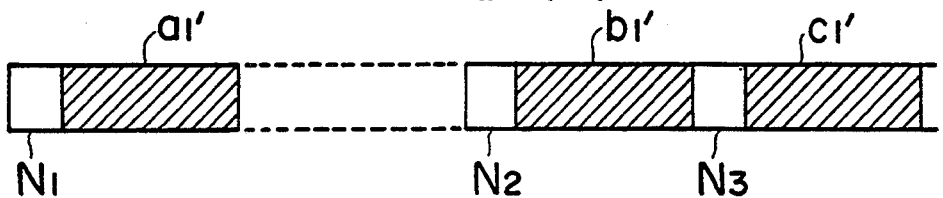
FIG. 13(c) is a diagram showing the packet data containing the disposal data of which the under-test device has disposed in the embodiment 5.

Next, the under-test device 6 performs the communications processing (step 506). Hereat, the packet data DD having the fixed pattern for the packet disposal among the packet data generated in the transmitting section 2 is disposed of under control by the under-test device 6. Then, as depicted in FIG. 13(c), the packet data containing the random pattern is not disposed of but returned again to the receiving section 3.

The control information determining section 37 determines whether or not the packet data to be disposed of has been disposed of by detecting whether the data disposal flag FG is "1" or not (step 507).

If the disposal flag FG is "1", the alarm section 39 gives an alarm because of a failure in data disposal control (step 508). If the disposal flag FG is "0", the control information detecting section 33 determines whether the sequence of the packet data containing the random patterns, the packet data delay time and a lack of the packet data are normal or not in accordance with the serial numbers (step 509). If the serial number is abnormal, the alarms for the data disposal, an overlap, etc. are given (step 510).

Figure 13D:
FIG. 13(d) is a diagram showing the plurality of random patterns after the under-test device has performed the disposal process in the embodiment 5.

Then, the depacket section 31 eliminates the packet header from each item of packet data (step 511). For instance, as illustrated in FIG. 13(d), the packet headers are removed from the random patterns a1', b1', c1' . . .

In this case, even when performing the disposal of the packet data DD, the random patterns a1', b1', c1' . . . are inputted to the error detector 7 in this sequence. The error detector 7 measures an error rate of the original random patterns (step 512). Consequently, an out-of-synchronism state of the random patterns disappears.

Thus, the error rate of the random patterns can be accurately measured even in the test involving the packet disposal.

As discussed above, the plurality of under-test devices 6 can be simultaneously tested by one or some packet switching testing apparatuses 1b. Further, even when requiring plural items of highway data, one or some packet switching testing apparatuses are capable of analyzing the characteristics. Further, the packet multiplexing section 32 and the packet demultiplexing section 22 control the packet data per highway, and, the characteristics on an arbitrary path can be therefore analyzed.

Moreover, the error rate of the random patterns can be measured even in the test involving the packet disposal.

It is apparent that, in this invention, a wide range of different working modes can be formed based on the invention without deviating from the spirit and scope of the invention. This invention is not restricted by its specific working modes except being limited by the appended claims.

What is claimed is:

1. A packet switching testing method of testing an under-test device for transferring communications information packetwise by connecting a plurality of input highways and a plurality of output highways to said under-test device, said method comprising:
   a transmitting step of transmitting the packet data to said under-test device; and
   a receiving step of receiving the packet data tested by said under-test device;
   said transmitting step including:
   a packet step of generating plural pieces of packet data by adding a packet header to each of a plurality of random patterns representing the communications information; and
   a highway demultiplexing step of demultiplexing the packet data generated in said packet step to the plurality of input highways,
   said receiving step including:
   a packet multiplexing step of multiplexing the packet data to one highway, the packet data being supplied via the plurality of output highways;
   a depacket step of fetching the random patterns out of the packet data multiplexed in said packet multiplexing step; and
   an error detecting step of detecting an error in the random pattern fetched in said depacket step.

2. The packet switching testing method according to claim 1, wherein said transmitting step includes:
   an initializing step of setting a different highway number as a packet header to each of the plurality of I/O highways and, at the same time, setting a number of input highways and a number of output highways that are to be used among the plurality of input highways and the plurality of output highways; and
   a highway demultiplex control step of demultiplexing the packet data to the highways corresponding to the numbers of I/O highways set in said initializing step.

3. The packet switching testing method according to claim 2, wherein said initializing step is to set the number of input highways and the number of output highways, corresponding to the plurality of input highways and one output highway which are connected to said under-test device.

4. The packet switching testing method according to claim 2, wherein said initializing step is to set the number of input highways and the number of output highways, corresponding to one input highway and the plurality of output highways which are connected to said under-test device.

5. The packet switching testing method according to claim 2, wherein said transmitting step includes a serial number step of counting a serial number per packet data, and said packet step is to add the counted serial number and the highway number to each packet data.

6. The packet switching testing method according to claim 5, wherein said receiving step includes:
   a detecting step of detecting a sequence of the packet data, a delay time of the packet data and a disposal of the packet data on the basis of the the serial numbers and the highway numbers contained in eah packet data from each output highway;
   said packet multiplexing step includes:

a storing step of causing a storing means to store each packet data from each output highway; and a reading/writing step of sequentially reading the packet data written to said storing mans in the same sequence as that of the packet data generated in said packet step on the basis of the packet data sequence, the packet data delay time and the packet data disposal which have been detected in said detecting step.

7. The packet switching testing method according to claim 5, wherein said transmitting step includes:

a serial number stopping step of supplying said serial number step with a stop signal for stopping counting the serial number with respect to the packet data to be disposed of when receiving information saying that some packet data should be disposed of; and a control information adding step of controlling said packet step so as not to write the random pattern but to add control information for effecting the packet disposal to the packet data to be disposed of when receiving the should-dispose-of information.

8. The packet switching testing method according to claim 7, wherein said control information is a disposal flag for indicating the packet disposal and a fixed pattern in place of the random pattern.

9. The packet switching testing method according to claim 7, wherein said receiving step, when said under-test device disposes of the packet data to be disposed of and the control information, includes:

a control information determining step of determining whether or not the control information is contained in the packet data from the output highways of said under-test device; and a notifying step of notifying that said under-test device fails in the packet disposal when determining that the control information is contained in the packet data in said control information determining step.

10. A packet switching testing apparatus for testing an under-test device for transferring communications information packetwise by connecting a plurality of input highways and a plurality of output highways to said under-test device, said apparatus comprising:

a transmitting means for transmitting the packet data to said under-test device; and a receiving means for receiving the packet data tested by said under-test device;

said transmitting means including:

a packet means for generating plural pieces of packet data by adding a packet header to each of a plurality of random patterns representing the communications information; and a highway demultiplexing means for demultiplexing the packet data generated by said packet means to the plurality of input highways, said receiving means including:

a packet multiplexing means for multiplexing-the packet data to one highway, the packet data being supplied via the plurality of output highways;

a depacket means for fetching the random patterns out of the packet data multiplexed by said packet multiplexing means; and an error detecting means for detecting an error in the random pattern fetched by said depacket means.

11. The packet switching testing apparatus according to claim 10, wherein said transmitting means includes:

an initializing means for setting a different highway number as a packet header to each of the plurality of I/O highways and, at the same time, setting a number of input highways and a number of output highways that are to be used among the plurality of input highways and the plurality of output highways; and a highway demultiplex control means for demultiplexing the packet data to the highways corresponding to the numbers of I/O highways set by said initializing means.

12. The packet switching testing apparatus according to claim 11, wherein said initializing means sets the number of input highways and the number of output highways, corresponding to the plurality of input highways and one output highway which are connected to said under-test device.

13. The packet switching testing apparatus according to claim 11, wherein said initializing means sets the number of input highways and the number of output highways, corresponding to one input highway and the plurality of output highways which are connected to said under-test device.

14. The packet switching testing apparatus according to claim 10, wherein said transmitting means includes a serial number means for counting a serial number per packet data, and said packet means adds the counted serial number and the highway number to each packet data.

15. The packet switching testing apparatus according to claim 10, wherein said receiving means includes:

a detecting means for detecting a sequence of the packet data, a delay time of the packet data and a disposal of the packet data on the basis of the serial numbers and the highway numbers contained in each packet data from each output highway;

said packet multiplexing means includes:

a storing means for storing each packet data from each output highway; and a reading/writing means for sequentially reading the packet data written to said storing means in the same sequence as that of the packet data generated by said packet means on the basis of the packet data sequence, the packet data delay time and the packet data disposal which have been detected by said detecting means.

16. The packet switching testing apparatus according to claim 10, wherein said transmitting means includes:

a serial number stopping means for supplying said serial number means with a stop signal for stopping counting the serial number with respect to the packet data to be disposed of when receiving information saying that some packet data should be disposed of; and a control information adding means for controlling said packet means so as not to write the random pattern but to add control information for effecting the packet disposal to the packet data to be disposed of when receiving the should-dispose-of information.

17. The packet switching testing apparatus according to claim 16, wherein said control information is a disposal flag for indicating the packet disposal and a fixed pattern in place of the random pattern.

18. The packet switching testing apparatus according to claim 16, wherein said receiving means, when said under-test device disposes of the packet data to be disposed of and the control information, includes:

a control information determining means for determining whether or not the control information is contained in the packet data from the output highways of said under-test device; and a notifying means for notifying that said under-test device fails in the packet disposal when said control information determining means determines that the control information is contained in the packet data.

* * * * *